(12) United States Patent
Huber Lindenberger et al.

(10) Patent No.: US 10,415,997 B2
(45) Date of Patent: Sep. 17, 2019

(54) POSITION SENSOR AND METHOD OF POSITION SENSING

(71) Applicant: Melexis Technologies SA, Bevaix (CH)

(72) Inventors: Samuel Huber Lindenberger, Jenaz (CH); Javier Bilbao De Mendizabal, Zurich (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 9 days.

(21) Appl. No.: 15/906,136

(22) Filed: Feb. 27, 2018

(65) Prior Publication Data

US 2018/0245948 A1 Aug. 30, 2018

(30) Foreign Application Priority Data

Feb. 28, 2017 (EP) .................................... 17158425

(51) Int. Cl.
*G01D 5/14* (2006.01)
*G01D 5/16* (2006.01)
*G01D 3/036* (2006.01)
*G01D 3/06* (2006.01)
*G01D 5/244* (2006.01)

(52) U.S. Cl.
CPC .......... *G01D 5/145* (2013.01); *G01D 3/0365* (2013.01); *G01D 3/06* (2013.01); *G01D 5/16* (2013.01); *G01D 5/24471* (2013.01)

(58) Field of Classification Search
CPC .......... G01D 5/12–2525; G01D 3/028; G01D 3/036; G01D 3/0365; G01D 3/06; G01R 33/00–18

See application file for complete search history.

(56) References Cited

U.S. PATENT DOCUMENTS

| | | | |
|---|---|---|---|
| 5,218,279 A | 6/1993 | Takahashi et al. | |
| 5,247,278 A * | 9/1993 | Pant | G01R 33/096 324/252 |
| 5,610,433 A | 3/1997 | Merrill et al. | |
| 6,870,457 B2 | 3/2005 | Chen et al. | |
| 8,054,155 B2 | 11/2011 | Raczkowski | |
| 9,547,024 B2 * | 1/2017 | Racz | G01R 19/0092 |
| 2007/0181963 A1 | 8/2007 | Berkcan et al. | |

(Continued)

FOREIGN PATENT DOCUMENTS

| | | |
|---|---|---|
| EP | 0902443 B1 | 3/2009 |
| WO | 9854547 A1 | 12/1998 |
| WO | 2014029885 A1 | 2/2014 |

OTHER PUBLICATIONS

European Search Report from EP Application No. 17158425.3, dated Jun. 21, 2017.

*Primary Examiner* — Huy Q Phan
*Assistant Examiner* — David B Frederiksen
(74) *Attorney, Agent, or Firm* — Workman Nydegger

(57) ABSTRACT

A method of determining a position of a sensor device relative to an external magnetic field, comprises: providing currents to conductors to generate an internal magnetic field that will superimpose with the external magnetic field, measuring field components of the combined magnetic field, calculating a position based on the applied currents and/or on the measured residual magnetic field. A position sensor is provided for performing the method.

13 Claims, 11 Drawing Sheets

(56) References Cited

U.S. PATENT DOCUMENTS

| | | | |
|---|---|---|---|
| 2011/0031960 A1* | 2/2011 | Hohe | G01R 33/0017 324/202 |
| 2012/0212216 A1* | 8/2012 | Stahl-Offergeld | G01R 33/0017 324/251 |
| 2013/0265036 A1* | 10/2013 | Friedrich | G01R 33/0094 324/207.2 |
| 2016/0139230 A1 | 5/2016 | Petrie et al. | |

* cited by examiner

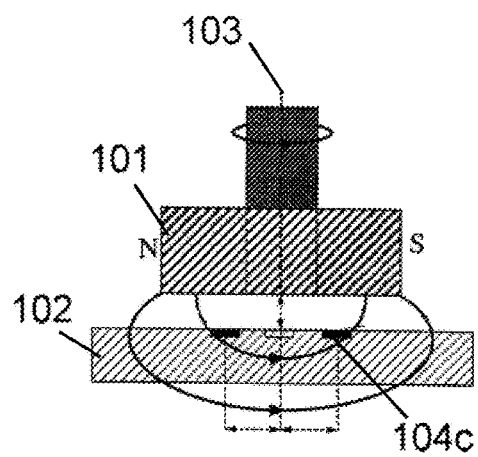
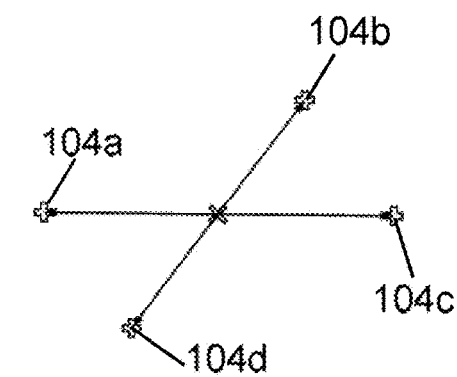
FIG. 1(a)            FIG. 1(b)
(prior art)
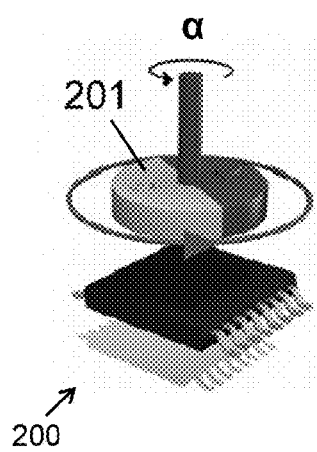
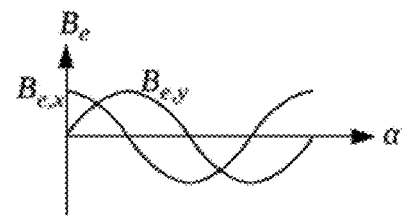
Measurement of $B_{x,e}$ and $B_{y,e}$ with magnetic field sensor $\Longrightarrow V_{S,x}$, $V_{S,y}$
Determination of angular position
$\alpha = \operatorname{atan}(V_{S,y} / V_{S,x})$
FIG. 2(a)            FIG. 2(b)

Position sensor with >=3 sensitive spots on different locations LOC1,LOC2,LOC3

With Magnetic Flux Guides

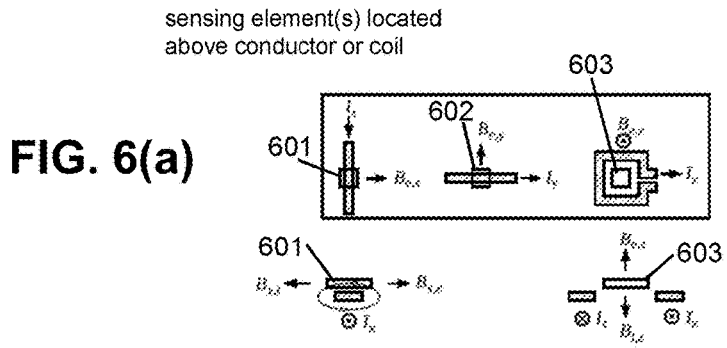
FIG. 6(a)
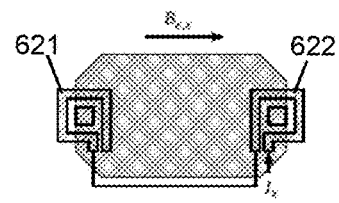
FIG. 6(b)
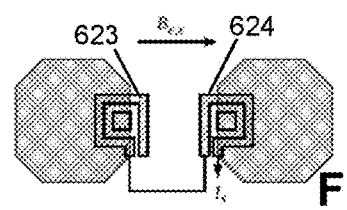
FIG. 6(c)
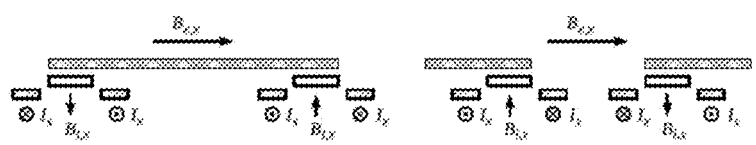
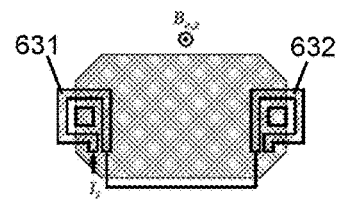
FIG. 6(d)
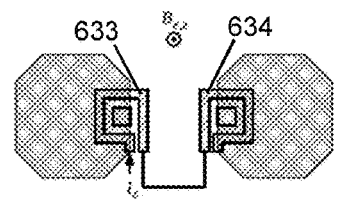
FIG. 6(e)
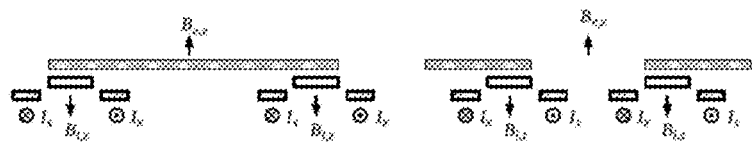

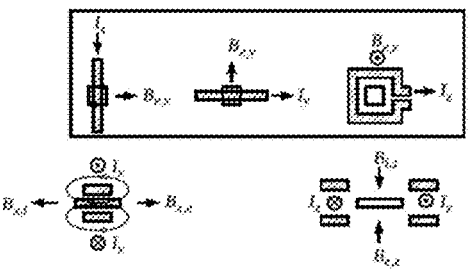
FIG. 8(a)
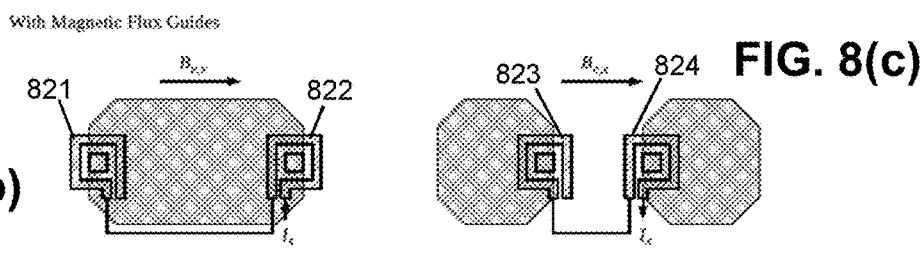
FIG. 8(b)  FIG. 8(c)
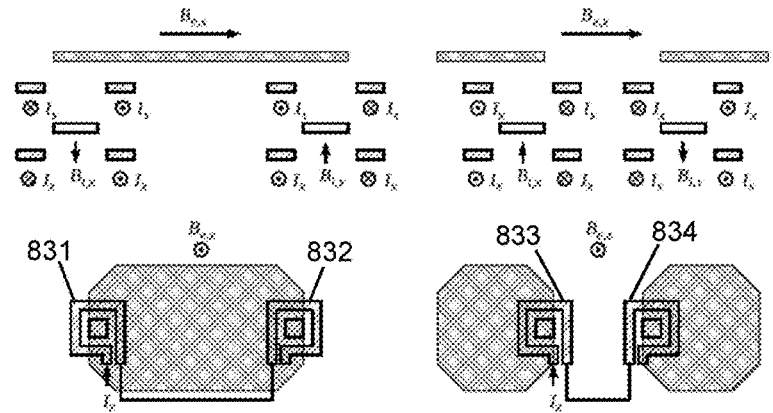
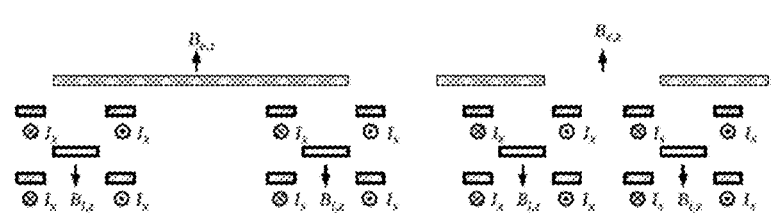
FIG. 8(d)  FIG. 8(e)

at least two sensing elements of a different type and/or size,
located on top of each other,
above, below or between upper and lower conductor or coil

FIG. 15(a) $\vec{B}_{tot}(x,y,z) = \vec{B}_{ext}(x,y,z) + \vec{B}_{int}(x,y,z)$

FIG. 15(b) $\vec{B}_{int}(x,y,z) = \vec{B}_{int1}(x,y,z) + \vec{B}_{int2}(x,y,z) + \vec{B}_{int3}(x,y,z)$

POSITION SENSOR AND METHOD OF POSITION SENSING

FIELD OF THE INVENTION

The present invention relates generally to the field of position sensors. More in particular, the present invention relates to magnetic position sensors and methods of magnetic position sensing.

BACKGROUND OF THE INVENTION

Position sensors, for example angular position sensors for measuring an angular position of a sensor chip (e.g. mounted to a stator) relative to one or more magnets (e.g. mounted to a rotor), are known in the art.

Various magnet arrangements are used in the art, for example a two-pole bar magnet or a two-pole disk magnet or a two-pole ring magnet, or a multi-pole disk magnet, or a multi-pole ring magnet, or a plurality of individual magnets arranged on a circle, etc.

Various algorithms or formulas are used in the art, for example based on goniometric functions, Fourier functions, etc.

By measuring the strength of the magnetic field generated by the magnet(s) at various locations, it is possible to calculate the position or orientation of the magnet(s) relative to the sensor elements.

WO9854547(A1) describes a sensor arrangement comprising an angular position sensor having at least three sensitive elements and a bar magnet. A method is described how the angular position can be calculated based on an arc-tan function of a ratio of differences between sensor values. The resulting angle is relatively insensitive (robust) against a constant external magnetic field (also referred to herein as "strayfield" or "Fremdfeld").

An advantage of using a ratio of two values, rather than the measured values themselves is that such methods are more robust against ageing effects. This principle is well known, and is used for example also in readout circuits of Wheatstone-bridges.

WO2014029885(A1) describes a sensor arrangement comprising an angular position sensor having a plurality of sensor elements arranged on a virtual circle, and comprising a multi-pole disk or multi-pole ring magnet. Depending on several parameters (e.g. the number of magnet poles, the number of sensor elements, the particular algorithm used, the orientation of the sensor elements) the resulting angle is relatively insensitive (robust) against a position error (of the sensor chip relative to the magnet), a constant external magnetic field, and in some cases, is even robust against a field gradient. The latter is especially advantageous in an automotive environment.

Various other sensor arrangements comprising one or more magnets and one or more position sensors, are known in the art, and various algorithms or mathematical functions are used, depending on the application, (e.g. a Fourier series). The various solutions address different requirements, and each solution has its own advantages and disadvantages.

SUMMARY OF THE INVENTION

It is an object of embodiments of the present invention to provide a position sensor and a method for determining a position.

This and other objectives are accomplished by a method and a position sensor according to embodiments of the present invention.

In a first aspect the present invention provides a method of determining a position of a sensor device relative to an external magnetic field. The method comprises applying or adjusting a first current to a first electrical conductor to generate a first internal magnetic field that will superimpose with the external magnetic field so as to form a first total magnetic field; measuring a component of the first total magnetic field at a first location using a first magnetic sensing element; applying or adjusting a second current to a second electrical conductor different from the first electrical conductor to generate a second internal magnetic field that will superimpose with the external magnetic field so as to form a second total magnetic field; measuring a component of the second total magnetic field at a second location using a second magnetic sensing element different from the first magnetic sensing element; calculating the position of the sensor device as a function of at least the first and the second current or as a function of the first and second current and taking into account the measured field components of the first total magnetic field at the first location and/or the measured field component of the second total magnetic field at the second location.

The step of "applying or adjusting determining a first and second current" can mean for example "initializing the first and second current with a first and second current value" to a first respectively second predefined value, preferably to a first non-zero value and a second non-zero value respectively.

The position may be an angular position, in which case the position sensor is an angular position sensor.

It is an advantage that this method is capable of determining a position (e.g. angular position) of the position sensor (e.g. angular position sensor) relative to a "weak magnet".

In some embodiments only one current is applied at the time and the resulting total magnetic field is measured at the corresponding location, and after time-multiplexing each of the currents, the angle is calculated. In other embodiments two or all of the currents are applied simultaneously.

In some embodiments the method comprises measuring at least three currents on at least three different locations.

In some embodiments the method further comprises the step of calculating a field gradient (e.g. dBz/dx or dBz/dy) by subtracting some of the measured values.

It is pointed out that some or all of the steps may be performed at the same time, as will be described in detail when discussing FIG. 10. Two specific cases are contemplated: (i) the case where the first current and the second current are applied at different moments in time, (ii) the case where the first current and the second current are applied simultaneously (in which case the total magnetic field Btot is a combination of the magnetic fields measured and the generated fields). For example, applying a current and measuring the current will normally take place at the same time.

In an embodiment the first current and the second current are applied in a time-multiplexed manner.

In an embodiment the first current and the second current are applied simultaneously.

In an embodiment the step of determining or updating a first current value comprises: i) measuring a first magnetic field component at a first location; ii) estimating or calculating or determining a first current value based on the measured first magnetic field component such that an amplitude of the field component of the total magnetic field will be smaller than an amplitude of the external magnetic field alone.

In other words, the current values are applied such that the amplitude of the total magnetic field components is reduced.

It is an advantage of reducing the amplitude of the total magnetic field components, because in this way an error due to a matching error between a first sensing element adapted for measuring the magnetic field in the first direction X, and a second sensing element adapted for measuring the magnetic field in the second direction Y, is reduced.

In an embodiment the method comprises an initial step of determining or updating a value of said first current by measuring said first magnetic field component at said first location and determining said first current value based on the measured first magnetic field component so that an amplitude of the component of the total magnetic field is smaller than an amplitude of the external magnetic field alone, and/or determining or updating a value of said second current by measuring said second magnetic field component at said second location and then determining said second current value based on the measured second magnetic field component so that an amplitude of the component of the total magnetic field is smaller than an amplitude of the external magnetic field alone.

In an embodiment the method comprises measuring the first current and/or the second current and exploiting the measured first and/or second current when calculating the position.

In an embodiment the method further comprises: adjusting the first current based on the measured field component of the first total magnetic field for reducing the amplitude of the field component of the first total magnetic field; adjusting the second current based on the measured field component of the second total magnetic field for reducing the amplitude of the field component of the second total magnetic field; measuring again the component of the first total magnetic field at a first location using the first magnetic sensing element; measuring again a component of the second total magnetic field at a second location using the second magnetic sensing element.

Referring to FIG. 10, a method according to this embodiment thus actually performs two "passes" through step b) and c). The calculation of step d) may be calculated once, or may be calculated more than once, for example twice, depending on the application.

In an embodiment the steps of adjusting and measuring are repeated until the amplitude of the field component of the first and second total magnetic field measured at said first and second location are both smaller in absolute value than a predefined threshold, the predefined threshold being smaller than 250 mT, e.g. smaller than 200 mT, e.g. smaller than 100 mT, e.g. smaller than 50 mT, e.g. smaller than 20 mT, e.g. smaller than 10 mT, e.g. smaller than 5 mT, e.g. smaller than 2 mT, e.g. smaller than 1 mT.

In an embodiment the step of calculating the position is based on the first and the second current value without taking into account the measured field component of the first and second total magnetic field.

In a second aspect the present invention relates to a method of tracking a position of a sensor device relative to an external magnetic field comprising: determining a position according to the first aspect, wherein the steps of adjusting and measuring are repeated continuously.

In an embodiment the step of adjusting the first and/or the second current comprises: testing whether the amplitude of the component of the first and second total magnetic field are both smaller in absolute value than a predefined threshold, the predefined threshold being smaller than 250 mT, e.g. smaller than 200 mT, e.g. smaller than 100 mT, e.g. smaller than 50 mT, e.g. smaller than 20 mT, e.g. smaller than 5 mT, e.g. smaller than 2 mT, e.g. smaller than 1 mT, meaning testing whether the internal magnetic field generated by the currents substantially cancels the external magnetic field; and if the outcome of the test is false, meaning that the internal magnetic field does not substantially cancel the external magnetic field, adjusting at least one of the first and second current; and if the outcome of the test is true, meaning that the internal magnetic field substantially cancel the external magnetic field), maintaining the first and second current.

The two component values can be amplitude of magnetic field in a particular direction or can be a value of a field gradient.

In an embodiment adjusting the current means increasing or decreasing with a predetermined amount, depending on whether the component of the measured total magnetic field is larger than or smaller than zero; or wherein adjusting the current means increasing or decreasing with an amount selected from a limited set of predetermined amounts, depending on whether the component of the measured total magnetic field is larger than or smaller than a set of predefined threshold values; (This can be implemented for example by comparing the measured value with a plurality of threshold values, either analog or digital); or wherein adjusting the current means applying a process control loop selected from the group consisting of a P control loop, a PI control loop, a PD control loop, a PID control loop.

In an embodiment the external magnetic field is created by a permanent magnet.

In an embodiment measuring the first and second magnetic field components comprises using a first and a second Hall element.

In an embodiment measuring the magnetic field component of the total magnetic field comprises using a first and a second magneto-resistive element.

In an embodiment measuring the magnetic field component of the total magnetic field comprises using a first and a second Hall element, and also using a first and a second magneto-resistive element having a different range than the first and second Hall element, and selecting or combining the measurement from the first Hall element and the first magneto-resistive element, and selecting or combining the measurement from the second Hall element and the second magneto-resistive element.

In an embodiment calculating the position comprises using one or more goniometric functions.

In a third aspect the present invention relates to a sensor device for determining a position of the sensor device relative to an external magnetic field, the sensor device comprising: at least a first magnetic sensing element adapted for sensing a magnetic field component at a first location, and a second magnetic sensing element for sensing a magnetic field component at a second location different from the first location; a readout-circuit connected to said first and second magnetic sensing element for obtaining a first and second signal indicative of said first and second magnetic field component; at least a first and a second electrical conductor or a first and a second coil; a current generator circuit connected to said first and second electrical conductor and adapted for causing at least a first current to flow in the first electrical conductor and for causing a second current to flow in the second electrical conductor, thereby generating an internal magnetic field that will superimpose with the external magnetic field so to form a combined magnetic field; a controller connected to said readout-circuit and to said current generator circuit, and adapted for performing the method according to the first aspect of the second aspect.

The sensor device may be an integrated silicon device.

In an embodiment the first and second sensing element is a first and a second Hall element.

In an embodiment the first and second sensing element is a first and a second magneto-resistive element.

In an embodiment the first and second sensing element is a first and a second Hall element, and the sensor device further comprises a third and fourth sensing element in the form of magneto-resistive elements, arranged on top of each other.

In an embodiment the current generator circuit comprises at least one current DAC, and wherein the step of calculating the position is based on signals obtained from the signal provided to the current DAC and optionally also based on signals obtained from the readout circuit; or wherein the sensor device further comprises at least one reference resistor adapted for converting the current flowing through the first and second electrical conductor into a voltage, and an Analog-to-Digital convertor for digitizing said voltage.

In a fourth aspect the present invention also provides a sensor arrangement comprising: a permanent magnet for generating a magnetic field external to a sensor device; a sensor device according to the third aspect, arranged in close vicinity to the permanent magnet.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter

BRIEF DESCRIPTION OF THE DRAWINGS

FIG. 1(a) is a replica of FIG. 1 of WO9854547(A1) and shows a conventional arrangement of a two-pole magnet relative to a sensor chip having four integrated magnetic sensing elements.

FIG. 1(b) is a replica of FIG. 2 of WO9854547(A1) and shows an arrangement of the four integrated magnetic sensing elements of FIG. 1(a) as two sensor pairs located within a sensor plane perpendicular to the axis of rotation.

FIG. 2(a) is a 3D perspective view on a sensor arrangement similar to that of FIG. 1(a), but using a two-pole disk magnet.

FIG. 2(b) illustrates how one pair of sensor elements can provide a sine-value, and the other pair of sensor elements can provide a cosine value, and how the angular position can be calculated from the sine and cosine value using an arc-tan function.

FIG. 6(a) to FIG. 9(c) show several arrangements of magnetic sensing element and conductors or coils, as can be used in embodiments of the present invention.

FIGS. 15(a) and 15(b) show a set of formulas applicable to the sensor arrangement of FIG. 14.

DETAILED DESCRIPTION OF ILLUSTRATIVE EMBODIMENTS

Figure 3:
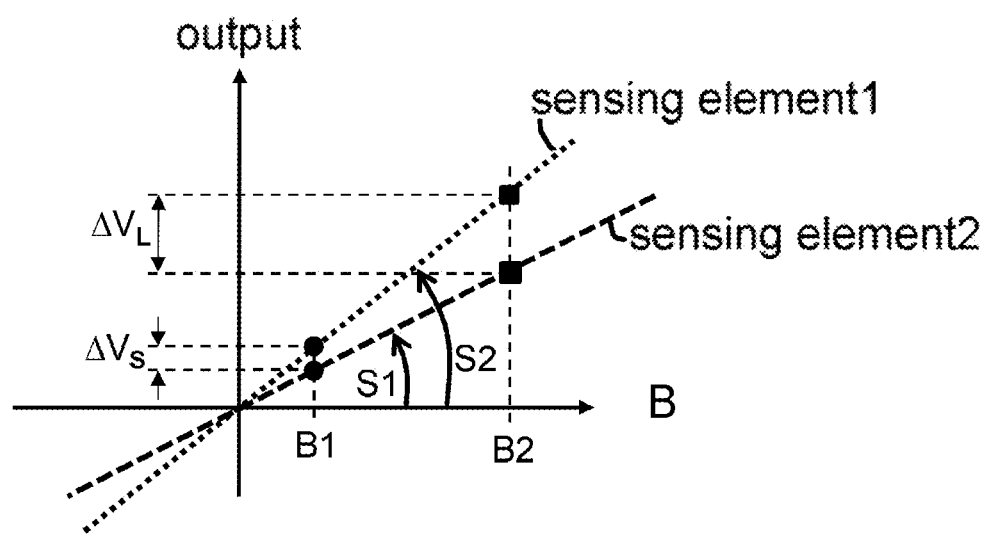
FIG. 3 illustrates a problem addressed by the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "coil" and "inductor" and "winding" are used as synonyms. In embodiments of the present invention, a coil can be implemented in a single plane, or in multiple planes, e.g. at the surface of a silicon substrate, and/or in multiple metal layers above a silicon plane, or even outside of the integrated device, e.g. using bonding wires.

In this document, the terms "combined magnetic field" or "total magnetic field" (referred to as "Btot") mean the same. They refer to the magnetic field (at a particular location x,y,z) which is the result of the superposition of the so called external magnetic field vector "Bext" (e.g. generated by a permanent magnet), and one or more internal magnetic field vectors "Bint" (e.g. generated by one or more currents flowing through one or more respective conductors, e.g. through one or more respective coils, either alone, or simultaneously).

The expression "internal magnetic field" can refer to the magnetic field generated by a single current flowing through a single conductor (e.g. a single coil) preferably arranged in close vicinity of a single magnetic sensing element, or can refer to the "vector combination of multiple such magnetic fields" each generated by a respective current flowing through a respective conductor or coil, each preferably arranged in close vicinity of a respective magnetic sensing element, depending on the context.

The expression "the total magnetic field is substantially zero (at the sensor location)" is used to mean that "the total magnetic field has an amplitude smaller than a predefined threshold (at the sensor location)", or more accurately, "the amplitude of the component of the magnetic field measurable by the magnetic sensing element (for example the amplitude of the Bz component of the total magnetic field, in case of a Horizontal Hall plate) is smaller than a predefined threshold".

With "weak magnet" is meant a magnet generating a magnetic field having a strength lower than 20 mTesla, e.g. lower than 15 mTesla, e.g. lower than 10 mTesla, e.g. lower than 5 mTesla, e.g. lower than 2 mTesla, or lower than 1.5 mTesla, or lower than 1 mTesla, when measured at a distance of about 2 mm from the magnet.

The present invention relates generally to the field of position sensors and methods of position sensing. More in particular, the present invention relates to magnetic angular position sensors and methods.

FIG. 1(a) is a replica of FIG. 1 of WO9854547(A1), and shows a conventional arrangement of a two-pole magnet 101 (having a north pole N and south pole S) relative to a sensor chip 102 having four integrated magnetic sensing elements 104, only three of which are visible in FIG. 1(a). The magnet 101 is rotatable about an axis 103.

FIG. 1(b) is a replica of FIG. 2 of WO9854547(A1) and shows an arrangement of the four integrated magnetic sensing elements 104 of FIG. 1(a) as two sensor pairs located within a sensor plane perpendicular to the axis of rotation 103. As explained in WO9854547(A1), it is possible to calculate a unique angular position (in a 360° range) of the magnet 101 relative to the sensor device 102. This is achieved by measuring the magnetic field component "Bz" in each of the four sensor locations, and by using mathematical calculations, based in particular on an arc-tan function of a ratio of difference values.

FIG. 2(a) is a 3D perspective view on a sensor arrangement 200 similar to that of FIG. 1(a), but using a two-pole disk magnet 201 instead of a bar magnet. But the principles of operation remain the same. It is assumed that the sensor device of FIG. 2(a) also has four sensing elements, like FIG. 1(b).

FIG. 2(b) illustrates how one pair of sensor elements can provide a sine-value (as a function of the angular position α), and the other pair of sensor elements can provide a cosine value (as a function of the angular position α), and how the angular position α can be calculated from the sine and cosine value, for example by calculating an arc-tan function of a ratio of values.

The accuracy of the resulting angle α depends on various aspects, such as for example the sensitivity of each of the four sensing elements. With "sensitivity" is meant the scaling factor or scaling function to convert the magnetic field value "B" into a signal obtainable from the sensing element (e.g. a differential voltage signal measured at the output nodes of a Hall plate).

It is known in the art to determine the sensitivity of each individual sensing element (or of pairs of sensor elements) during a calibration test, e.g. as part of an end-of-line test (EOL) during production, and to store calibration data in a non-volatile memory in the device for later use. This provides accurate results on the short term, even in case of sensitivity mismatch between the individual magnetic sensing elements, as long as the sensitivity of the sensing elements does not change, but in practice the accuracy decreases over time, because the sensitivity of each of the elements varies over time, e.g. due to ageing effects, mechanical stress, etc, and typically varies differently for each of the sensing elements.

The present invention is concerned with the particular problem of long term sensitivity mismatch between the plurality of sensing elements of the sensor device.

This problem is illustrated in FIG. 3 for two sensing elements, but of course, a sensor device can have more than two sensing elements, for example an angular sensor device typically has at least three magnetic sensing elements, for example has four or six or eight or ten or twelve or sixteen, or more than sixteen sensing elements, each of which may have (and typically will have) a different sensitivity, for example the first sensing element may have a sensitivity S1, the second sensing element may have sensitivity S2, etc.

It is repeated that the specific problem that the present invention tries to solve is not the fact that S1 is different from S2, which problem can effectively be solved by a calibration test (as described above), but the present invention is concerned with the specific problem that S1 and S2 can (and typically will) vary in a different way over time, due to ageing effects (also known as "drift" or "long term drift"). For example S1 may increase over time and S2 may decrease over time.

In other words, the present invention is concerned with the specific problem of long-term sensitivity mismatch between the sensing elements of the sensor device.

The present invention is at least partly based on the insight that the deviation (or error) due to sensitivity drift is typically larger when the magnetic field component to be measured is larger (e.g. has a larger amplitude), and is smaller when the magnetic field component to be measured is smaller (e.g. has a smaller amplitude).

The inventors of the present invention came to the idea of reducing (or in some embodiments even eliminating) the effect of long-term sensitivity mismatch by reducing the magnetic field to be measured.

More specifically, the inventors of the present invention propose to create one or more local magnetic fields (by applying one or more currents I1, I2, etc. to specific conductors or coils arranged in close vicinity of the sensing elements) in order to reduce, but preferably to completely compensate the external magnetic field "Bext".

The inventors came to the further insight that it is not required to create an internal magnetic field $\vec{B}int(x,y,z)$ that is substantially zero everywhere on the chip, (which is practically impossible, especially for compensating a complex magnetic field such as the one generated by a quadrupole magnet), but they realized that it suffices that the total magnetic field $\vec{B}tot(x,y,z)$ is made substantially zero selectively at each of the locations of the sensor elements. This is achieved in some embodiments of the present invention by applying an individual current to only one of the respective conductors (e.g. coils) in the vicinity of a particular sensor element.

But they realized that it is also possible to create a combined internal field which is the superposition of multiple individual internal magnetic fields $\vec{B}int1(x,y,z)$+$\vec{B}int2(x,y,z)$+$\vec{B}int3(x,y,z)$, generated by simultaneously applying at least two currents in said conductors or coils, chosen such that the total magnetic field $\vec{B}tot(x,y,z)$=$\vec{B}ext(x,y,z)$+$\vec{B}int(x,y,z)$ is substantially zero in all of the sensor locations at the same time. This is achieved in other embodiments of the present invention.

When the total magnetic field Btot at the location of one or each of the sensing elements of the sensor device is substantially zero, the output signal of said one or each of the sensing elements will also be zero (see FIG. 3, not taking into account a potential offset). Under this condition (zero total field at one sensor location, or zero total field simultaneously at each of the sensor locations), the internal magnetic field "Bint" or fields is/are substantially equal to the external magnetic field at said sensor location or locations. But since the internal magnetic field(s) is/are created by means of locally generated currents, the amplitude of which currents are well defined (e.g. is/are known, e.g. when generated by making use of a current DAC, or can be measured e.g. using a reference resistor and an ADC), the angular position α can be expressed as a function of these current or currents in an accurate manner, and in a manner independent of sensitivity mismatch due to ageing or drift.

In preferred embodiments of the present invention, a digital or analog control loop is used to repeatedly or continuously determine or adjust the current or currents such that the resulting total magnetic field Btot measured at said single sensor location, or simultaneously at said multiple sensor locations is substantially zero. Such embodiments of a position sensor are referred to herein as "closed-loop position sensors".

These are the underlying ideas of the present invention.

Figure 4:
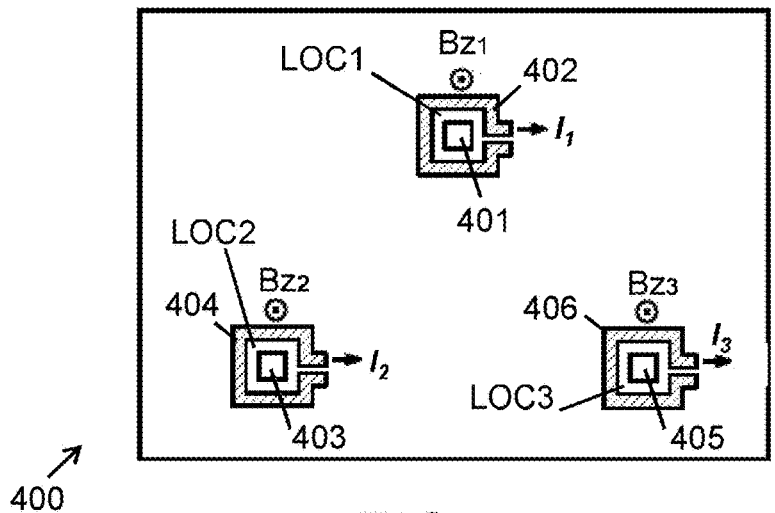
FIG. 4 shows a sensor device comprising three sensing elements, each of which is surrounded by a coil for creating a local magnetic field, as can be used in embodiments of the present invention.

FIG. 4 is a schematic representation of a sensor device 400 having three magnetic sensing elements 401, 403, 405, located at three different locations LOC1, LOC2, LOC3 on a substrate for measuring three magnetic field values. But of course, the present invention is not limited to this particular arrangement, and sensor devices according to the present invention can also have more than three sensor elements.

In the example shown, the magnetic sensing elements are horizontal Hall elements (also known as horizontal Hall plates), but the present invention is not limited thereto, and other magnetic sensing elements can also be used, such as for example vertical Hall elements, or magneto-resistive elements, e.g. GMR elements, or TMR elements, etc. But for ease of the description, the present invention will be further described for horizontal Hall elements.

In some embodiments, the at least three sensing elements 401, 403, 405 are not located on a straight line.

In other embodiments, the at least three sensing elements 401, 403, 405 are located on a straight line.

The horizontal Hall elements allow to measure the magnetic field component, oriented perpendicular to the plane of the substrate, referred to herein as the "Bz"-component. By measuring the value of the vertical field component "Bz" at three different locations LOC1, LOC2, LOC3 on the substrate, and by subtracting them, it is possible to determine dBz/dx and dBz/dy. If the sensor elements are arranged on a circle, other techniques can be used (e.g. Fourier analysis). As already described in the background section, there exist several suitable arrangements and corresponding algorithms or formulae to calculate an angular position, many or all of which can be used in combination with the principles of the present invention, but the focus of the present invention is not on finding new topologies or new formulas, but on the manner in which the magnetic field is determined, namely by creating an internal field that at least reduces, but preferably completely compensates the external magnetic field Bext.

Referring back to the example of FIG. 4. The first sensing element 401 measures a first field component Bz1 oriented in a Z-direction perpendicular to the plane of the substrate at a first location LOC1, the second sensing element 403 measures a second field component Bz2 oriented in the Z-direction, but at a second location LOC2 on the substrate, and the third sensing element 405 measures a third field component Bz3 oriented in the Z-direction, but in a third location LOC3. The sensing elements may for example be horizontal Hall plates, integrated in a CMOS device.

As can be seen, each of the three sensing elements 401, 403, 405 is surrounded by a respective coil 402, 404, 406. The first coil 402 is adapted for generating a local magnetic field $\vec{B}int1(x,y,z)$ mainly at the first sensor location LOC1.

In some embodiments of the present invention, at most one current I1, I2 or I3 is flowing through the coils 402, 404, 406 at any moment in time. A controller or control loop will for example set I2 and I3 to zero, and will estimate or determine the first current I1 for which the total magnetic field (read: the superposition of Bext+Bint1) is substantially zero at the first sensor location LOC1. After the first current I1 is found, I1 and I3 are set to zero, and the controller or control loop can find the second current I2 for which the total magnetic field (read: Bext+Bint2) is substantially zero at the second sensor location LOC2. Finally, after the second current I2 is found, I1 and I2 are set to zero, and the controller or control loop can find the third current I3 for which the total magnetic field (read: Bext+Bint3) is substantially zero at the third sensor location LOC3. If the external field is stationary, or varying only slowly, it is well possible to "measure" each of the field components, one after the other in a time-multiplexed manner, by only applying one current at the time. After the three field components are thus determined, the angle α of the sensor device can then be calculated as a function of the current values of I1, I2 and I3. This embodiment has the advantage that no cross-talk between the different coils 402, 404, 406 need to be taken into account, and that the total current consumption is relatively small.

In other embodiments of the present invention, at least two currents, or at least three currents I1, I2, I3 are flowing through the respective coils simultaneously. In this case, the field Bint1 generated by the first current I1 also has an influence on the value measured by the second and third sensor element, and vice versa. This phenomenon is called "cross-talk". However, the value of this cross-talk is well defined by the topology, and can be taken into account relatively easily. In this case, preferably, the three currents are applied at the same time, and their values are chosen (e.g. regulated) such that the total magnetic field (read: Bext+Bint1+Bint2+Bint3) is substantially zero at each of the sensor locations LOC1, LOC2 and LOC3 at the same time. This embodiment has the disadvantage that the calculations are somewhat more complex, because cross-talk needs to be taken into account, but has the big advantage that it can provide accurate results and allows fast tracking of the angular position α, inter alia because the currents only need minor adjustment each time. It is noted that the control loop may adjust all three currents in each iteration, or may adjust only one current or only two currents in each iteration. Control loops are well known in the art, and need therefore not be explained in more detail here.

Figure 5:
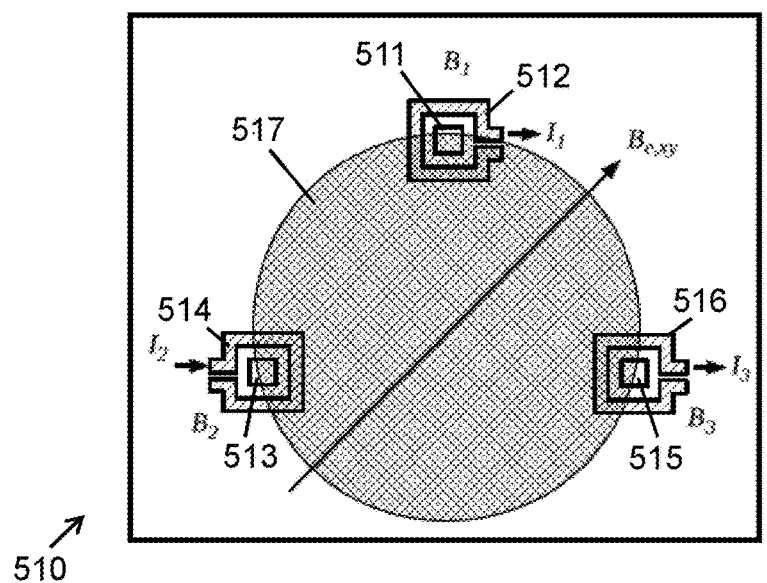
FIG. 5 shows the sensor device of FIG. 4 further comprising one or more magnetic flux guides, e.g. IMC.
Figure 7A:
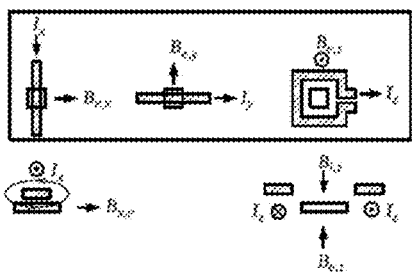
Figure 7B:
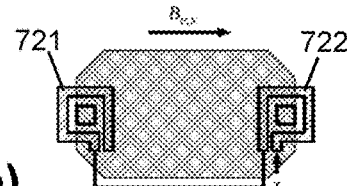
Figure 7C:
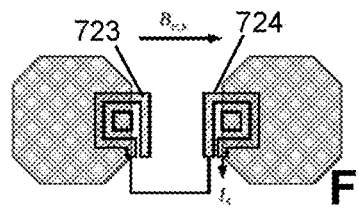
Figure 7D:
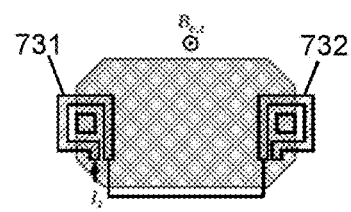
Figure 7E:
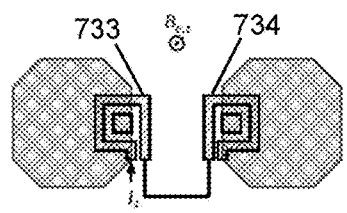

FIG. 5 shows a variant of the sensor device 400 of FIG. 4 further comprising a magnetic flux guide, also known as "integrated magnetic concentrator", abbreviated as IMC. The reader not familiar with IMC can find more information in WO2014029885(A1) for example. IMC offers the advantage of increasing the signal strength in a passive manner, by concentrating flux lines, and also offers the advantage of bending flux lines such that horizontal Hall plates can be used to measure Bx and By components of the external magnetic field Bext, which would otherwise be oriented in a direction parallel to the substrate.

However, the present invention is not limited to sensor devices having horizontal Hall plates or having only horizontal Hall plates as the sensing elements, and other magnetic sensitive elements, such as for example vertical Hall plates, or magneto-resistive (MR) devices, e.g. giant MR (GMR) elements, or tunneling MR (TMR) elements, can also be used.

Figures 9A, 9B, 9C:
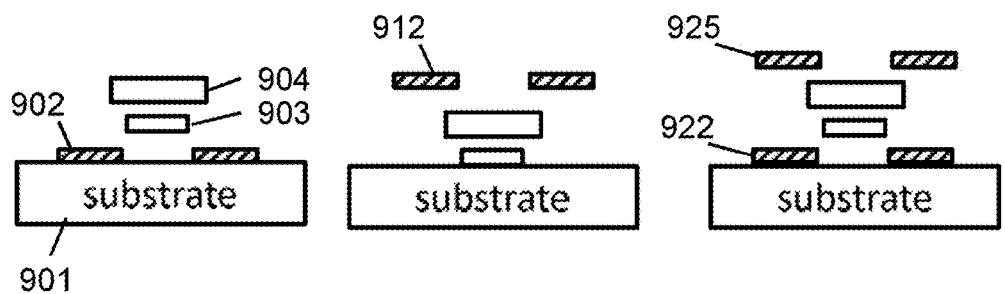

In particular embodiments of the present invention the sensor device comprises two different kinds of magnetic sensitive elements at each sensing location, for example a Hall plate and a GMR element (see also FIGS. 9(a) to 9(c)).

FIG. 6(a) to FIG. 9(c) show several arrangements of conductors and sensing elements as can be used in embodiments of the present invention. These examples are not limiting, and are only intended to illustrate that it is possible to generate a local magnetic field that counteracts an external magnetic field, by running a current through an electrical conductor arranged in close vicinity of the sensing element.

FIG. 6(a) shows three conductors, each arranged near a magnetic sensing element, in top view (in the rectangle above) and in cross sectional view (below the rectangle). The conductor on the left of FIG. 6(a) can generate a magnetic field "Bx" parallel to the surface in a first direction X. The conductor in the middle of FIG. 6(a) can generate a magnetic field "By" parallel to the surface, in a direction Y, preferably perpendicular to the direction X. The conductor on the right of FIG. 6(a) has the shape of a coil, and can generate a magnetic field "Bz" perpendicular to the surface.

FIG. 6(b) shows an arrangement with two coils and IMC, in top view (above) and in cross sectional view (below). The sensor elements are located between the coils and the IMC. This can for example be implemented by using post-processing techniques such as for example sputtering, stacked die, electroplating, epitaxial growth.

FIG. 6(c) shows a variant of FIG. 6(b), having two separate flux guides (or IMC) instead of only one. FIG. 6(d) is a variant of FIG. 6(b), and FIG. 6(e) is a variant of FIG. 6(c).

FIG. 7(a) to FIG. 7(e) is a variant of FIG. 6(a) to FIG. 6(e) respectively, where the at least one conductor or coil is located higher than or above or on top of the sensing element, whereas in FIG. 6 the conductor or coil was located lower than or under the sensing element.

FIG. 8(a) to FIG. 8(e) is a variant of FIG. 6(a) to FIG. 6(e) respectively, having a conductor below or underneath, and also a conductor above or on top of the sensing element, or in other words, the sensing element is located between an upper and a lower conductor or coil. Of course, it may also be possible to locate the conductors at the same level as the sensitive element (e.g. in the same plane as the horizontal Hall element).

FIG. 9(a) to FIG. 9(c) are schematic drawings similar to those of the lower part of FIG. 8(b), showing a cross sectional view of a sensor device comprising a substrate 901, and one or more conductors 902 or coils, and a first magnetic sensitive element 903 of a first kind and a first size, and a second magnetic sensitive element 904 of a second kind and a second size, the first and second sensitive elements 903, 904 being located at substantially the same location for sensing the same magnetic field component.

For example, one of the elements may be a horizontal Hall plate, and the other element may be a Giant Magneto Resistive (GMR) element. During use, the value obtained from the Hall element may be used for example when the total magnetic field is relatively large, e.g. larger than 250 mTesla, and the value obtained from the GMR may be used for example when the total magnetic field is relatively small, e.g. smaller than 50 mTesla. In the range between 50 mTesla and 250 mTesla, the sensor values may for example be combined, e.g. averaged, or one of the values may be selected.

FIG. 9(b) shows an example where two sensing elements of a different type (e.g. Hall versus GMR versus TMR) and/or of a different size are both located lower than or under the electrical conductor(s) or coil(s) 912.

FIG. 9(c) shows an example where two sensing elements of a different type (e.g. Hall versus GMR versus TMR)

and/or of a different size are both located between lower electrical conductor(s) or coil(s) 922 and upper electrical conductor(s) or coil(s) 925.

In a variant of the arrangements shown in FIG. 9(*a*) to FIG. 9(*c*) IMC is added.

But the present invention is not limited to the topologies or arrangements shown in FIG. 6(*a*) to FIG. 9(*c*), and the skilled person having the benefit of the present invention can easily think of other variants, for example a variant like the one shown in FIG. 9(*a*) where the electrical conductors are located between the first sensing element 903 and the second sensing element 904 is also possible. For example, in case a coil is used having multiple windings implemented in multiple layers, the sensing elements may be arranged below/above/between any of these layers. But the principles of the present invention remain the same.

Figure 10:
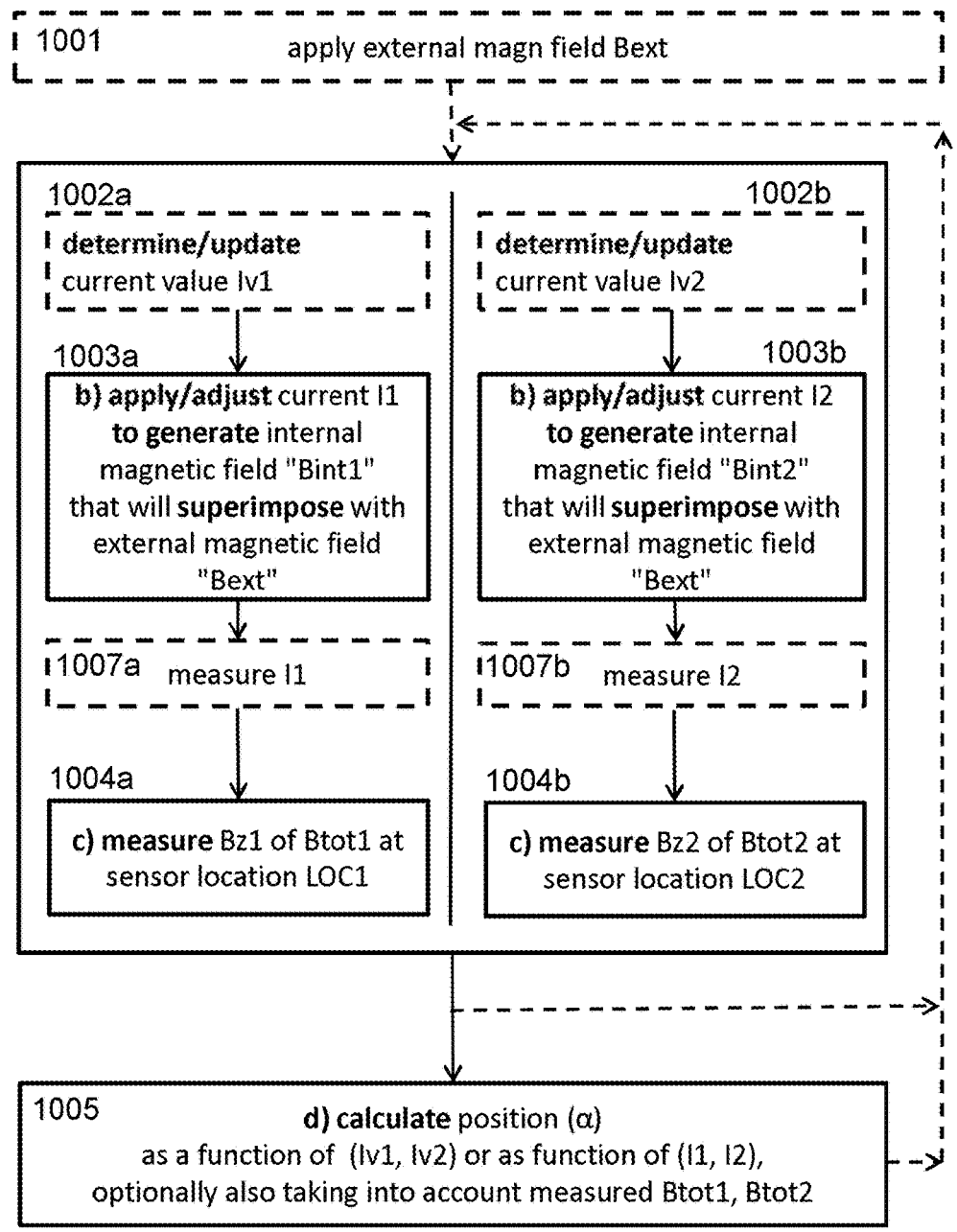
FIG. 10 shows a method according to an embodiment of the present invention.

FIG. 10 shows a method 1000 of determining a position α of a sensor device relative to an external magnetic field Bext, according to an embodiment of the present invention. This method can for example be implemented in a sensor device 1450 shown in FIG. 14. The method comprises the steps of:

In optional step 1001 an external magnetic field Bext is applied in the vicinity of the sensor device, for example by arranging a permanent magnet 1490 (see FIG. 14) in close vicinity to the sensor device 1450, or by generating an external magnetic field by running one or more currents through an electrical conductive structure, or the external field may also be the earth magnetic field (e.g. in compass applications). In preferred embodiments of the present invention, it is assumed that the sensor device was already arranged in close vicinity to a permanent magnet, for example as illustrated in FIG. 1(*a*) or FIG. 2(*a*), but the permanent magnet need not be a two-pole magnet, but may be a multi-pole magnet, for example a quadrupole or a six-pole magnet.

In optional step 1002, at least two current values, namely a first current value Iv1 and a second current value Iv2 are determined, for example by measuring a first magnetic field value at a first sensor location LOC1 using a first Hall element 401 and by measuring a second magnetic field value at a second sensor location LOC2 using a second Hall element 403, followed by an ADC or one or more comparators, and by estimating or calculating current values Iv1, Iv2 that will likely reduce, or ideally completely compensate the external magnetic field Bext, when being applied to electrical conductors or coils 402, 404 located respectively at said first and second location. As described above, the values of the current I1 and I2 may be determined in a time-multiplexed manner, or simultaneously.

In step 1003*a* a first current I1 (optionally corresponding to the first current value Iv1) is applied to a first electrical conductor, thereby generating an internal magnetic field "Bint1" that will superimpose with the external magnetic field "Bext" so as to form a combined magnetic field "Btot1". At the same or a different moment in time, in step 1003*b* a second current I2 (optionally corresponding to the second current value Iv2) is applied to a second electrical conductor different from the first electrical conductor thereby generating an internal magnetic field "Bint2" that will superimpose with the external magnetic field "Bext" so as to form a combined magnetic field "Btot2".

In optional step 1007*a* the first current I1 is measured (e.g. using a first reference resistor in series with the first conductor, and a first ADC), and in optional step 1007*b* the second current I2 is measured (e.g. using a second reference resistor in series with the second conductor, and a second ADC). The first ADC may be the same as the second ADC, in which case typically an analog multiplexer would be used. In case the magnetic ficurrents are applied, the steps 1002*a* and 1002*b* may be.

In step 1004*a* a value Btot1 of the first magnetic field Btot1 is measured at a first sensor location LOC1, and in step 1004*b* a value Btot2 of the total magnetic field Btot2 is measured at a second sensor location LOC2. As described above, this can happen in a time-multiplexed manner, or simultaneously.

In step 1005, a position α (e.g. angular position) is calculated or estimated or otherwise determined as a function of the first and second current value Iv1, Iv2 and/or as a function of the first and second current I1, I2, and optionally further taking into account the measured first and second (residual) field Btot1, Btot2 measured in step 1004 (*a/b*).

The combination of steps 1002, 1003, 1004 and 1005 describe a first basic form of a method according to the present invention.

The combination of steps 1003, 1007, 1004 and 1005 describe a second basic form of a method according to the present invention.

The combination of steps 1002, 1003, 1007, 1004 and 1005 describe a third basic form of a method according to the present invention.

It is noted that, in case the current I1 and I2 are applied separately, one after the other, some or all of the steps 1002*a*, 1003*a*, 1007*a* and 1004*a* on the left side of the vertical line are applied (with I2=0), and thereafter some or all of the steps 1002*b*, 1003*b*, 1007*b* and 1004*b* on the right side of the vertical line are applied (with I1=0).

It is noted that steps 1002*a/b* are typically meant in case a current-DAC is used, in which case the current values Iv1, Iv2 can be determined (step 1002*a/b*) separate from the actual current generation itself (step 1003*a/b*), but the determination of the current value (step 1002*a/b*) may be omitted in case no current-DAC is used, but the currents I1, I2 are applied and/or adjusted in another way, e.g. in an analog manner.

It is noted that steps 1007*a/b* are typically present if the currents I1, I2 are not generated by a current-DAC, but are generated for example in an analog manner, in which case steps 1002*a/b* would typically not be present.

But of course, it is also possible to measure the currents (step 1007*a/b*) even when the currents are generated by a current DAC, in which case steps 1002*a/b* and steps 1007*a/b* would both be present.

Figure 11:
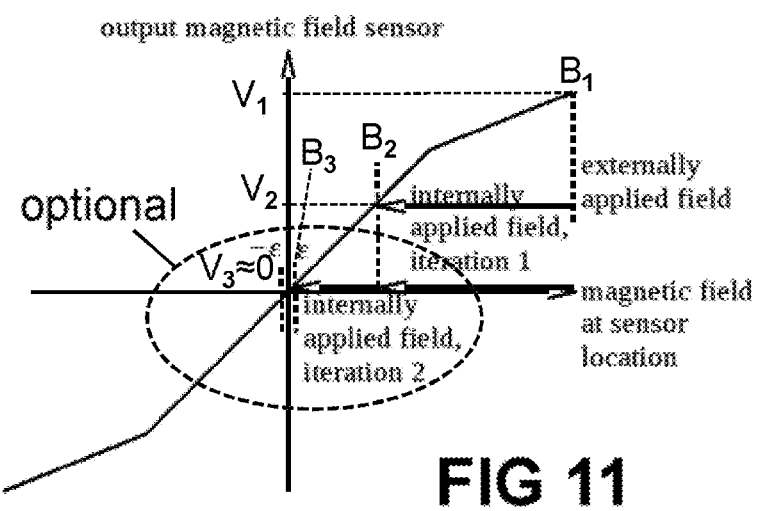
FIG. 11 illustrates the method of FIG. 10.

FIG. 11 (without the optional part) illustrates the method 1000 described above for a single sensing element and for one iteration only. In case a current is applied to each of the plurality of electrical conductors at the same time, a similar graph can be shown for each sensing element.

Stated in simple terms, the method boils down to the following: instead of measuring the value V1 corresponding to magnetic field component B1 (of the external magnetic field without internal magnetic field), which requires using the sensitivity factor or function of the particular sensing element, which sensitivity can and typically will drift over time due to ageing, the external magnetic field "Bext" is reduced by generating a local magnetic field "Bint" that at least partly, but preferably completely counteracts the external field "Bext", which fields will superimpose, resulting in a reduced magnetic field B2. The angle α can then be calculated as a function of at least the first and the second current or as a function of at least the first and the second current and thereby taking into account the measured component of the first total magnetic field at the first location and/or the measured component of the second total magnetic field at the second location. This angle is less subjective to sensitivity mismatch of the different sensing elements.

The first and second current can be exploited via current values Iv1 and Iv2 determined before the first and second current, respectively, were applied, or current values measured after the first and second current, respectively, were applied.

The current values Iv1, Iv2 may for example be 8-bit or 10-bit or 12-bit or 14-bit 16-bit digital values which are sent to a "current DAC". The current I1 and I2 are actual currents flowing through the conductor or coil, an amplitude of which can be measured for example using a reference resistor and an ADC convertor.

In case the current I1 and I2 generate an internal magnetic field Bint1 and Bint2 that is exactly the inverse to the external magnetic field Bext, the angular position $\alpha$ of the sensor device can be derived from the current values Iv1 and Iv2 (or the measured currents I1, I2) alone, without having to take into account the measured remaining field Btot, because the latter is substantially zero.

While the method described above may determine the values of Iv1, Iv2 first-time-right (for obtaining zero magnetic field), in practice, that is usually not the case, and one or more adjustments may be needed to gradually reduce the total field "Btot" to a small value, e.g. substantially equal to "zero", or in practice to reduce the amplitude of the total magnetic field Btot at the sensor locations below a predefined threshold value $\varepsilon$, or to reduce the amplitude of the readout signal V below a predefined threshold $\delta$.

To this end, the method 1000 further comprises an optional step where the values of Iv1, Iv2 (or I1, I2) are updated, for example based on the measured values Btot1, Btot2 obtained in step 1004 or based on the angular position $\alpha$ calculated in step 1005. The steps 1003, 1004 and 1005 are then repeated to determine an updated angle. It can be understood that step 1005 (of actually calculating the angle) may be executed twice, but that is not absolutely required, and it would also be possible to perform step 1005 only after the first iteration, or after two iterations, etc.

This is schematically illustrated in FIG. 11, including the optional part. Thus, in a first pass, the amplitude of the Bz component of Bext is reduced from B1 to B2, and in a second pass (after updating the current value(s), the total magnetic field (superposition of Bext plus Bint) is reduced further from B2 to B3, which is closer to zero.

It is noted that "the update" can be implemented in various ways, for example by incrementing or decrementing with a fixed value (e.g. by incrementing or decrementing with 1 least significant bit (LSB) of a current DAC), but other updating algorithms can also be used, for example algorithms that dynamically adjust the step-size, or in case an analog control loop is used, the control loop may be selected from any one of a so called P control loop, a PI control loop, a PD control loop, a PID control loop. (P stands for proportional, I for integrating, D for differentiating, as is well known in the art of control theory). The update algorithm may adjust one current at the time, or may adjust all the currents at the same time, for example three currents I1, I2, I3 in case of three sensing elements.

Of course, the number of iterations may, but need not be limited to only two, and "the loop" may also be executed repeatedly or continuously, resulting in a method that can accurately track a angular position $\alpha$, even when the angle is varying over time.

In preferred embodiments of the present invention, the measurements of step 1004 are performed using "highly sensitive" sensing elements, such as for example magnetoresistive (MR) elements, e.g. GMR or TMR elements. While such devices have a limited dynamic range, and therefore would not be suitable for direct measurement of the original external magnetic field Bext, they can very advantageously be used in embodiments of the present invention, where the (total) magnetic field to be measured by the sensing elements is reduced, preferably to a value close to zero.

In some embodiments each sensor location comprises an MR element as the only magnetic sensitive element, and a conductor (e.g. a coil).

In other embodiments, each sensor location comprises both a Hall element and an MR element, and a conductor (e.g. a coil).

In yet other embodiments, some sensor locations (e.g. LOC1 to LOC3) contain Hall elements without a coil, and other sensor locations (let's call them LOC4 to LOC6) contain a GMR element and a conductor e.g. a coil for making the magnetic field at the latter locations substantially equal to zero.

The skilled person having the benefit of the present invention can easily come up with other alternatives.

Figure 12:
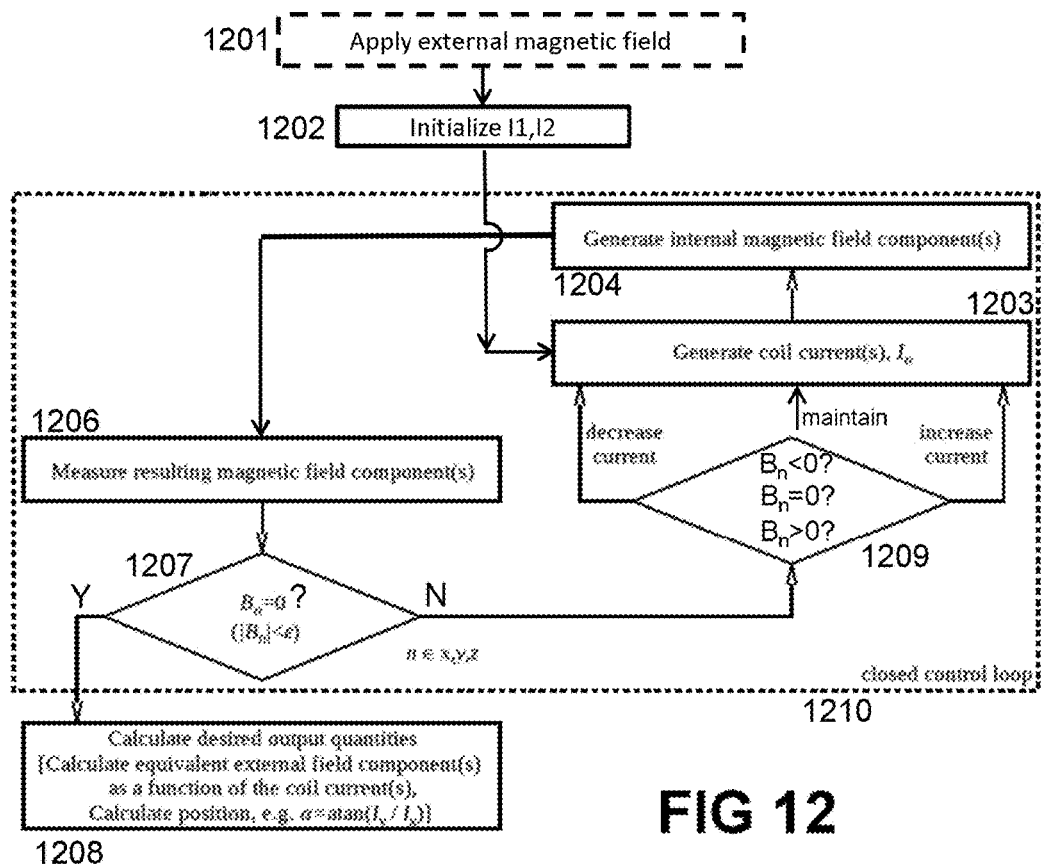
FIG. 12 shows an example or a variant of the method of FIG. 10.

FIG. 12 shows an example or a variant of a method shown in FIG. 10, containing a loop which is executed repeatedly or continuously. The control loop is adapted for adjusting the current values Iv1, Iv2 and/or the corresponding currents I1, I2 such that the resulting total magnetic field "Btot" is reduced to substantially a "zero-field" (or more accurately, the component measurable by the magnetic field sensor is reduced to a value close to zero). The angular position $\alpha$ is calculated as a function of the current values Iv1, Iv2 or the measured current I1, I2 but without taking into account the measured residual magnetic field (which is near-zero anyway). The method of FIG. 12 contains the following steps:

In optional step 1201, an external magnetic field "Bext" is applied, e.g. by arranging a permanent magnet (e.g. a dipole or a quadrupole ring magnet or a quadrupole ring magnet, etc.) in close vicinity of a sensor device.

In step 1202 the current values Iv1, Iv2 are initialized, for example they are preset to predefined values, or the external magnetic field Bext is measured using sensing elements with a relatively large dynamic range (e.g. Hall elements), if present.

In step 1203 current I1 and I2 corresponding to the current values Iv1 and Iv2 are generated.

In step 1204 these currents I1, I2 are applied to electrical conductors or coils, in order to generate internal magnetic fields Bint1, Bint2, which preferably at least partly counteract, but ideally completely compensate the external magnetic field Bext at the locations of the sensing elements. Full compensation is usually not achieved in a single iteration, but the compensation gets better and better in subsequent iterations.

The magnetic field "Bint" is superimposed with the external magnetic field "Bext", so as to form a combined or total magnetic field "Btot".

In step 1206 components of this total magnetic field "Btot" are measured using magnetic sensitive elements, which may be the same elements as used in step 1202, or may be other elements, for example more sensitive elements, e.g. MR elements.

In step 1207 it is tested whether these measured field component values are smaller or larger in absolute value, than a predefined threshold $\varepsilon$, or the corresponding voltages are smaller or larger in absolute value that a threshold $\delta$.

In step 1208 the angular position α is calculated as a function of the current values Iv1, Iv2 or as a function of the measured currents I1, I2 (which may be measured for example using a reference resistor and an ADC, not shown in FIG. 12).

In step 1209 it is tested whether the value of the resulting total magnetic field (or the value V of the sensing element) is smaller than zero, equal to zero or larger than zero, and depending on the outcome of the test, the current values Iv1, Iv2 or I1, I2 are updated by decreasing, maintaining, or increasing them accordingly.

Then step 1203 is performed again, and the cycle is repeated using the updated current values Iv1, Iv2 or I1, I2.

The remarks made to the method of FIG. 10 are also applicable here, e.g. related to the update-algorithm being for example a P or PI or PD or PID algorithm, or related to applying only one current at the time in a time-multiplex manner and doing so for each current individually before calculating the angle) or by updating and applying all the currents at the same time, etc.

When comparing FIG. 10 and FIG. 12, it can be seen that the angular position α calculated using the method shown in FIG. 10 still has some dependence on the sensitivity of the various sensing elements, but because the total magnetic field "Btot" is reduced, the effect of drift of sensitivity variations between the different sensing elements is reduced. However, in the method of FIG. 12, the angular position α is calculated independent of the sensitivity of the sensing elements, and therefore this value does not suffer from sensitivity mismatch due to ageing.

Figure 13:
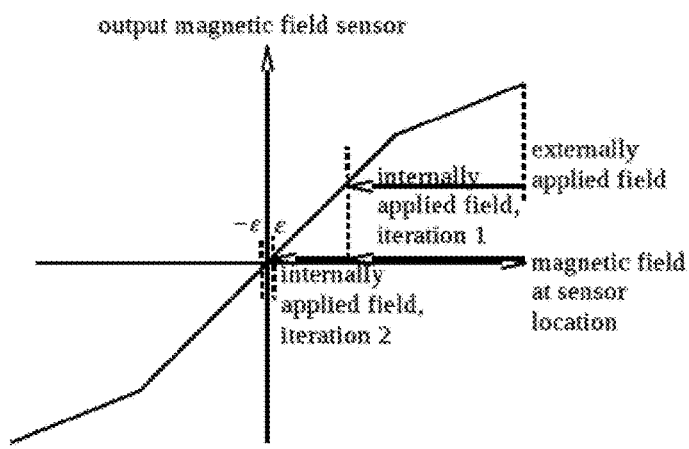
FIG. 13 illustrates the method of FIG. 12.

FIG. 13 illustrates the method of FIG. 12 for one field component, e.g. Bz measured at a first location, but similar graphs can be shown for the field components Bz measured at other locations.

In a variant of the method of FIG. 12 (not shown), in step 1208 the angle is calculated as a function of the current values Iv1, Iv2 or the currents I1, I2 but taking into account also the measured residual field values Btot1 and Btot2. It is contemplated that such embodiments can track the angular position even better, because the momentary magnetic field values can be taken into account, even before the currents Iv1, Iv2, I1, I2 are updated that would create a zero total field.

Figure 14:
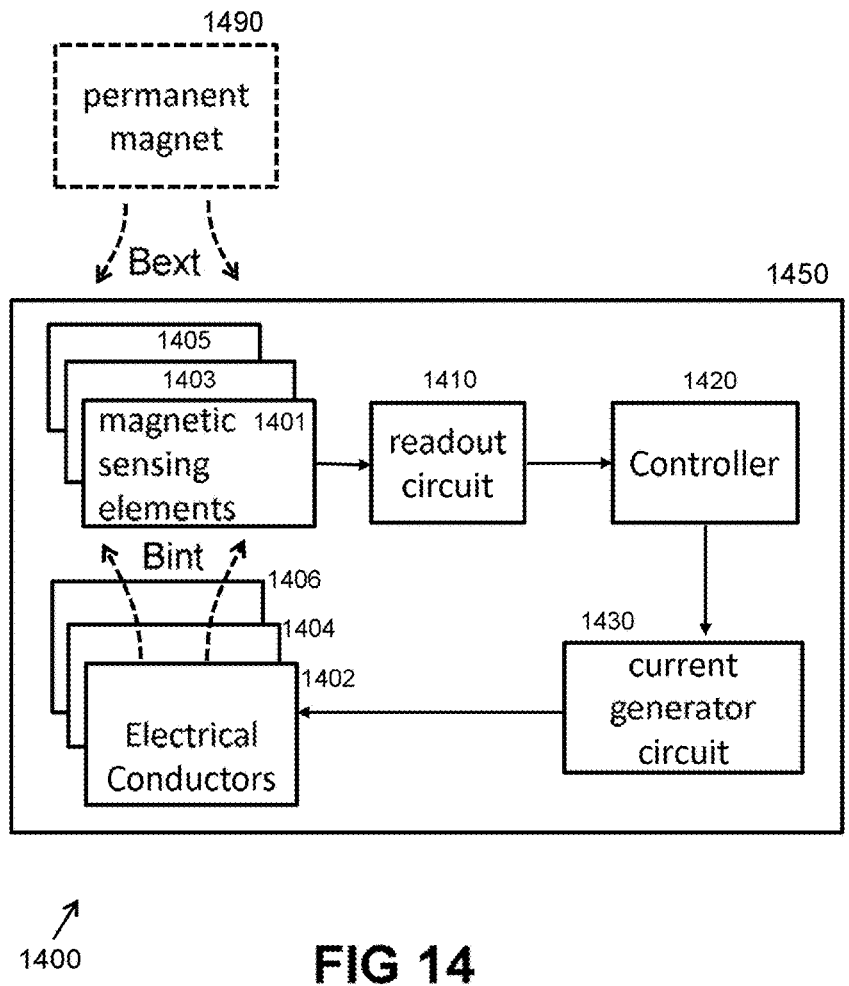
FIG. 14 shows a sensor arrangement according to the present invention, comprising a permanent magnet and a sensor device according to the present invention.

FIG. 14 shows a sensor arrangement comprising a permanent magnet 1490 (e.g. mounted to a rotor) and a sensor device 1450 (e.g. an integrated semiconductor device mounted to a stator).

The permanent magnet 1490 creates a magnetic field "Bext". The magnetic field generated by the magnet may be a relatively weak magnetic field (see definition above).

The sensor device 1450 is arranged in close vicinity of the permanent magnet 1490, e.g. at a distance between 0.5 mm and 20.0 mm, e.g. at about 2.0 mm or at about 5.0 mm or at about 10 mm, and is not in physical contact with the permanent magnet 1490, thus is arranged in a contactless manner to the magnet.

The sensor device 1450 comprises:
a plurality of at least two or at least three magnetic sensing elements 1401, 1402, 1403, for example at least two or at least three Hall elements, or at least two or at least three Magneto-Resistive elements, or at least two or at least three Hall elements plus at least two or at least three MR elements;
a readout circuit 1410 for reading out the magnetic sensing elements 1401, 1402, 1402. In case of Hall elements, the readout circuit may also comprise a biasing circuit for applying a current or a voltage to the Hall plates, and may comprise a switching device for applying the well-known "spinning-current technique", and may comprise a multiplexer and/or an amplifier, all of which are well known in the art, or may comprise any other suitable sub-circuit typically found in readout circuitry;
a controller 1420, which can be for example a digital state-machine, or a programmable processor comprising or connected to memory, e.g. a volatile memory (RAM) and/or non-volatile memory (e.g. ROM, EEPROM, FLASH, etc). The non-volatile memory may comprise software code fragments for performing at least some of the steps of the method shown in FIG. 10 or FIG. 12;
a current generator circuit 1430 for generating at least two or at least three currents Ix, Iy. The current generator circuit may for example comprise a current DAC, and optionally a demultiplexer and/or current mirrors, etc.
a plurality of at least two or at least three electrical conductors and/or coils 1441, 1442, 1443 for generating the internal magnetic field(s).

The controller is adapted for performing a method as described above, for example in FIG. 10 or FIG. 12.

Many variants of the sensor device 1450 are possible. For example, the sensor device may further comprise a signal processing circuit (not shown) arranged between the magnetic sensing elements and the readout circuit, or arranged between the readout circuit and the controller 1420. The signal processing circuit may for example comprise a low-pass filter and/or a low-noise amplifier, or the like.

The current generator circuit 1430 may comprise a current DAC, and/or one or more current mirrors.

The sensor device 1450 may further comprise a multiplexer or demultiplexer between the current generator circuit 1430 and the electrical conductors or coils.

The sensor device 1450 may further comprise current measurement means for measuring the current flowing through the at least two or at least three electrical conductors or coils. The current measurement means may comprise one or more reference resistors and an ADC. The ADC may be part of the controller.

FIGS. 15(*a*) and 15(*b*) show two formulas which can be used in embodiments of the present invention, in particular:

$$\vec{B}tot(x,y,z) = \vec{B}ext(x,y,z) + \vec{B}int(x,y,z)$$

meaning that the total magnetic field Btot is a superposition of the external magnetic field and the internal magnetic field Bint. The latter may correspond to a single magnetic field, or may itself be the superposition of two or more magnetic fields, and can be expressed as follows:

$$\vec{B}int(x,y,z) = \vec{B}int1(x,y,z) + \vec{B}int2(x,y,z) + \vec{B}int3(x,y,z)$$

where $\vec{B}int1(x,y,z)$ is generated by a first current I1 flowing in a first conductor (e.g. a first coil) near a first magnetic field sensor, $\vec{B}int2(x,y,z)$ is generated by a second current I2 flowing in a second conductor (e.g. a second coil) near a second magnetic field sensor, and $\vec{B}int3(x,y,z)$ is generated by a third current I3 flowing in a third conductor (e.g. a third coil) near a third magnetic field sensor.

When the currents are time-multiplexed, then the internal magnetic field is equal to:

$$\vec{B}int(x,y,z) = \vec{B}int1(x,y,z)$$

when the first current I1 is applied (but I2=I3=0), and the internal magnetic field is equal to:

$$\vec{B}int(x,y,z) = \vec{B}int2(x,y,z)$$

when the second current I2 is applied (but I1=I3=0), etc.

While various aspects of the present invention have been described in separate drawings, it is contemplated that the various aspects can be combined in suitable manners.

Some embodiments of the sensor device 1450 contain only Hall elements, preferably horizontal Hall elements as the magnetic sensing elements. Other embodiments of the sensor device 1450 contain only magneto-resistive elements as the magnetic sensing elements. Yet other embodiments of the sensor device 1450 contain both Hall elements and magneto-resistive elements as the sensing elements (see for example FIGS. 9(*a*) to 9(*c*)), where each Hall element and a corresponding magneto-resistive element are arranged to measure substantially the same magnetic field component, but at a different resolution or with a different dynamic range.

FIG. 4 and FIG. 5 show a topology with only three sensing elements, (FIG. 4 without IMC, FIG. 5 with IMC) to explain the principles of the present invention, but of course, the present invention is not limited to this particular topology. It is explicitly contemplated that the sensing elements can be arranged on a circle, for example as described in WO2014029885(A1), which is incorporated herein by reference in its entirety, in particular for the physical arrangement of the sensor elements, and for the particular arrangements of sensor elements and IMC, and for the specific formulae. For example, when using the topology of FIG. 12 of WO2014029885(A1), a sensor device according to the present invention would have four Hall elements located at 180° and 45°, and each Hall element would have a local coil surrounding it.

In the drawings, the coils are only shown in a single layer for illustrative purposes, but the present invention is not limited to sensor devices 1450 having coils with only a single winding, and coils with multiple windings can also be used in embodiments of the present invention. It is noted in this respect that integrated coils with multiple windings are well known in the art, for example from: EP0902443B1, or U.S. Pat. No. 5,610,433A, or U.S. Pat. No. 6,870,457B2, or U.S. Pat. No. 8,054,155B2, just to name a few. The coils may be integrated in the chip, for example implemented in 2 metal layers or in 3 metal layers or in 4 metal layers or in 5 metal layers, or in 6 metal layers, or in more than 6 metal layers. But the coils may also be partly implemented by bonding wires, for example.

While the invention is described mainly for determining a single angular position around a single axis, it will be understood that the same principles can also be applied to determine a position on a linear axis. This can for example be done by providing a magnet rail for providing a sinusoidal signal, and by using at least two sensor elements located on a quarter wavelength apart, or by measuring two orthogonal magnetic components such as for example Bx and Bz such that they measure a sine signal and a cosine signal.

But other variants are also possible, for example to use two longitudinal magnet rails with a different period, and to use at least two sensor elements for each of them, and using the nonius-scale principle in the calculation of the position. In this way the angular position can be created even more accurate.

In yet another embodiment, the principles explained above are used to determine a first angular position α around a first axis, and the same principles but using another magnet and using another set of sensor elements are used to determine an angular position β about a second axis, and optionally also an angular position γ about a third axis. The first, second and third axis may be perpendicular to each other. Such a method can then be used to determine a three-dimensional angular position.

The invention claimed is:

1. A method of determining a position of a sensor device relative to an external magnetic field, the method comprising the steps of:
    applying or adjusting a first current to a first electrical conductor to generate a first internal magnetic field that will superimpose with the external magnetic field so as to form a first total magnetic field;
    measuring a component of the first total magnetic field at a first location using a first magnetic sensing element;
    applying or adjusting a second current to a second electrical conductor different from the first electrical conductor to generate a second internal magnetic field that will superimpose with the external magnetic field so as to form a second total magnetic field;
    measuring a component of the second total magnetic field at a second location using a second magnetic sensing element different from the first magnetic sensing element;
    calculating the position of said sensor device
    as a function of at least the first and the second current or
    as a function of the first and the second current and taking into account-the measured component of the first total magnetic field at the first location, and/or the measured component of the second total magnetic field at the second location.

2. The method according to claim 1, comprising an initial step of determining or updating a value of said first current by:
    i) measuring said first magnetic field component at said first location;
    ii) determining said first current value based on the measured first magnetic field component so that an amplitude of the component of the total magnetic field is smaller than an amplitude of the external magnetic field alone;
and/or determining or updating a value of said second current by:
    i) measuring said second magnetic field component at said second location;
    ii) determining said second current value based on the measured second magnetic field component so that an amplitude of the component of the total magnetic field is smaller than an amplitude of the external magnetic field alone.

3. The method according to claim 1, comprising measuring said first current and/or said second current and exploiting the measured first and/or second current when calculating said position.

4. The method according to claim 1, further comprising:
    adjusting the first current based on the measured component of the first total magnetic field for reducing the amplitude of the component of the first total magnetic field;
    adjusting the second current based on the measured component of the second total magnetic field for reducing the amplitude of the component of the second total magnetic field;
    measuring again the component of the first total magnetic field at said first location using the first magnetic sensing element;
    measuring again a component of the second total magnetic field at said second location using the second magnetic sensing element.

5. The method according to claim 4, wherein the steps of adjusting and measuring are repeated until the amplitude of the components of the first and second total magnetic field measured at said first and second location are both smaller in absolute value than a predefined threshold, the predefined threshold being smaller than 250 mT.

6. The method according to claim 3, wherein the steps of adjusting and measuring are repeated a number of times.

7. The method according to claim 1, wherein the step of adjusting the first and/or the second current comprises testing whether the amplitude of the component of the first and second total magnetic field are both smaller in absolute value than a predefined threshold, the predefined threshold being smaller than 250 mT, and if the outcome of the test is false, adjusting at least one of the first and second current and if the outcome of the test is true, maintaining the first and second current.

8. The method according to claim 7, wherein adjusting the current means increasing or decreasing with a predetermined amount, depending on whether the component of the measured total magnetic field is larger than or smaller than zero; or
  wherein adjusting the current means increasing or decreasing with an amount selected from a limited set of predetermined amounts, depending on whether the component of the measured total magnetic field is larger than or smaller than a set of predefined threshold values; or
  wherein adjusting the current means applying a process control loop selected from the group consisting of a proportional (P) control loop, a proportional integrating (PI) control loop, a proportional differentiating (PD) control loop, and a proportional differentiating integrating (PID) control loop.

9. The method according to claim 1, wherein the external magnetic field is created by a permanent magnet; and/or
  wherein measuring the first and second magnetic field components comprises using a first and a second Hall element; and/or
  wherein measuring the magnetic field component of the total magnetic field comprises using a first and a second magneto-resistive element; and/or
  wherein measuring the magnetic field component of the total magnetic field comprises using a first and a second Hall element, also using a first and a second magneto-resistive element having a different range than the first and second Hall element, and selecting or combining the measurement from the first Hall element and the first magneto-resistive element, and selecting or combining the measurement from the second Hall element and the second magneto-resistive element; and/or
  wherein calculating the position comprises using one or more goniometric functions.

10. A sensor device for determining a position of the sensor device relative to an external magnetic field, the sensor device comprising:
  at least a first magnetic sensing element adapted for sensing a magnetic field component at a first location, and a second magnetic sensing element for sensing a magnetic field component at a second location different from the first location;
  a readout-circuit connected to said first and second magnetic sensing element for obtaining a first and second signal indicative of said first and second magnetic field component;
  at least a first and a second electrical conductor or a first and a second coil;
  a current generator circuit connected to said first and second electrical conductor and adapted for causing at least a first current to flow in the first electrical conductor and for causing a second current to flow in the second electrical conductor, thereby generating an internal magnetic field that will superimpose with the external magnetic field so to form a combined magnetic field;
  a controller connected to said readout-circuit and to said current generator circuit, and adapted for performing the method according to claim 1.

11. The sensor device of claim 10, wherein the first and second sensing element is a first and a second Hall element; or
  wherein the first and second sensing element is a first and a second magneto-resistive element; or
  wherein the first and second sensing element is a first and a second Hall element, and the sensor device further comprises a third and fourth sensing element in the form of magneto-resistive elements, arranged on top of each other.

12. The sensor device of claim 10, wherein the current generator circuit comprises at least one current Digital-to-Analog converter (DAC), and wherein the step of calculating the position is based on signals obtained from the signal provided to the current DAC and optionally also based on signals obtained from the readout circuit; or
  wherein the sensor device further comprises at least one reference resistor adapted for converting the current flowing through the first and second electrical conductor into a voltage, and an Analog-to-Digital convertor for digitizing said voltage.

13. A sensor arrangement comprising:
  a permanent magnet for generating a magnetic field;
  a sensor device according to claim 10, arranged in close vicinity to the permanent magnet.

* * * * *